United States Patent
Sasaki et al.

(10) Patent No.: US 6,949,486 B2
(45) Date of Patent: Sep. 27, 2005

(54) DIELECTRIC CERAMIC COMPOSITION, ELECTRONIC DEVICE AND THEIR PROCESS OF MANUFACTURING

(75) Inventors: Hiroshi Sasaki, Akita-ken (JP); Yasuo Niwa, Akita-ken (JP); Matsumi Watanabe, Akita-ken (JP)

(73) Assignee: TDK Corporation, Tokyo (JP)

( * ) Notice: Subject to any disclaimer, the term of this patent is extended or adjusted under 35 U.S.C. 154(b) by 57 days.

(21) Appl. No.: 10/740,488

(22) Filed: Dec. 22, 2003

(65) Prior Publication Data

US 2004/0132609 A1 Jul. 8, 2004

(30) Foreign Application Priority Data

Dec. 25, 2002 (JP) .................................. 2002-374153

(51) Int. Cl.[7] .......................................... C04B 35/465
(52) U.S. Cl. ...................................... 501/136; 264/615
(58) Field of Search ........................ 501/136; 264/615

(56) References Cited

FOREIGN PATENT DOCUMENTS

| JP | 1-143104 | * | 6/1989 |
| JP | A 8-45348 | | 2/1996 |
| JP | A 11-240753 | | 9/1999 |
| JP | A 11-278925 | | 10/1999 |

* cited by examiner

*Primary Examiner*—Karl Group
(74) *Attorney, Agent, or Firm*—Oliff & Berridge, PLC

(57) ABSTRACT

A dielectric ceramic composition comprising a main component including 53.00 to 80.00 mol % magnesium oxide converted to MgO, 19.60 to 47.00 mol % titanium oxide converted to $TiO_2$ and 0.05 to 0.85 mol % manganese oxide converted to MnO. This dielectric ceramic composition may comprises 0.00 to 0.20 mol % of at least any one of vanadium oxide, yttrium oxide, ytterbium oxide or holmium oxide converted to $V_2O_5$, $Y_2O_3$, $Yb_2O_3$ and $Ho_2O_3$ respectively.

18 Claims, 2 Drawing Sheets

DIELECTRIC CERAMIC COMPOSITION, ELECTRONIC DEVICE AND THEIR PROCESS OF MANUFACTURING

BACKGROUND OF THE INVENTION

1. Field of the Invention

The present invention relates to dielectric ceramic composition, electronic device and their process of manufacturing and, further in detail, to temperature-compensating dielectric ceramic composition of non-reducing property preferably used for electronic device such as multilayer ceramic capacitor having base metal as internal electrode.

2. Description of the Related Art

Multilayer ceramic capacitor is broadly used as electronic device, and a large number of the multilayer ceramic capacitors is used in an electronic device. Multilayer ceramic capacitor is normally manufactured by stacking the internal electrode layer pastes and dielectric layer pastes with such as sheet method or printing method and thus cofiring.

Dielectric ceramic material used such as for conventional multilayer ceramic capacitor, when firing in the atmosphere of reducing property, has a property of being reduced and semiconductorized. Therefore, as internal electrode material, metals such as Pd which does not melt at the sintering temperature of dielectric ceramic material and also does not become oxidized even when firing under high oxygen pressure which does not semiconductorize the dielectric ceramic material was used.

However, metals such as Pd are precious that it is a major obstacle for attempt to reduce the price of multilayer ceramic capacitor. Therefore, as internal electrode material, the use of relatively low priced base metal of Ni or Ni-alloys are becoming to be the mainstream.

On the contrary, when using the base metal as conductive material of internal electrode layer, firing in an atmosphere leads to the oxidation of the internal electrode. Therefore, dielectric layer and internal electrode layer need to be cofired in reducing atmosphere.

But when fired in reducing atmosphere, dielectric layer is reduced and insulation resistance is lowered. Therefore, dielectric material of non-reducing property is provided. For instance, dielectric ceramic compositions of Mg—Ti—O series have excellent temperature characteristic of dielectric constant and widely used for temperature-compensating ceramic capacitor.

However, these dielectric ceramic compositions of Mg—Ti—O series, when fired under reducing atmosphere, are reported to be reduced and semiconductorized to have a remarkable property of reducing resistance (See non-patent article 1: Journal of the Ceramic Society of Japan 100 [10] 1992, "Phase-Fine structure change of $MgTiO_3$ ceramics by treatment in reduction"). Moreover, dielectric ceramic compositions of Mg—Ti—O series, for deposit of Ti-rich heterogeneous phase (Acicular crystal) while sintering, are considered to be difficult for composition control.

Further, The Patent Article 1: The Japanese Unexamined Patent Publication No. 11-240753, The Patent Article 2: The Japanese Unexamined Patent Publication No. 11-278925 and The Patent Article 3: The Japanese Unexamined Patent Publication No. 8-45348 disclose dielectric ceramic composition mainly comprising $MgTiO_3$. However, dielectric ceramic compositions as in The Patent Articles 1 to 3 were not dielectric ceramic composition of non-reducing property that can apply to Ni internal electrode.

The present invention has been made in consideration with the above circumstances and has an object to provide dielectric ceramic composition of non-reducing property preferably used for multilayer ceramic capacitor having base metal, such as Ni, as internal electrode which is hard to reduce resistance even firing in reduced atmosphere and has high relative dielectric constant and small amount of dielectric loss.

BEST MODE FOR CARRYING OUT THE INVENTION

The present inventors, to attain the above object, earnestly examined and as a result, the followings were detected to complete the present invention. A dielectric ceramic composition comprising a main component including 53.00 to 80.00 mol % magnesium oxide converted to MgO, 19.60 to 47.00 mol % titanium oxide converted to $TiO_2$ and 0.05 to 0.85 mol % manganese oxide converted to MnO is hard to reduce resistance even firing in reduced atmosphere and has high relative dielectric constant and small amount of dielectric loss.

That is to say, dielectric ceramic composition according to the present invention comprises a main component including 53.00 to 80.00 mol %, preferably 60.00 to 70.00 mol %, magnesium oxide converted to MgO, 19.60 to 47.00 mol %, preferably 29.60 to 39.90 mol %, titanium oxide converted to $TiO_2$ and 0.05 to 0.85 mol % %, preferably 0.20 to 0.60 mol %, manganese oxide converted to MnO.

When a content of magnesium oxide is too small, on firing in reduced atmosphere, dielectric ceramic composition is liable to be reduced and semiconductorized, and when too large, it is liable to lower relative dielectric constant.

When a content of titanium oxide is too small, dielectric ceramic composition is liable to lower the relative dielectric constant and when too large, it is liable to be reduced and semiconductorized.

When a content of manganese, oxide is too small, dielectric ceramic composition is liable to be reduced and semiconductorized, and when too large, segregation (segregation such as Mn—Ni—O) with internal electrode material including base metal such as nickel is likely to occur, contact may be defective and reliability is liable to decline.

Dielectric ceramic composition of the present invention, preferably, as subcomponent, comprises, with respect to entire dielectric ceramic composition, 0.00 to 0.20 mol %, preferably 0.00 to 0.05 mol % of at least any one of vanadium oxide, yttrium oxide, ytterbium oxide or holmium oxide converted to $V_2O_5$, $Y_2O_3$, $Yb_2O_3$ and $Ho_2O_3$ respectively.

These subcomponents, the same as manganese oxide, are materials providing reducing resisting property. When additive amount of these subcomponents are too large, segregation is likely to occur, contact may be defective and reliability is liable to decline.

Manufacturing process of dielectric ceramic composition according to the present invention comprises the steps of preparing source material of said dielectric ceramic composition and firing said source material under the temperature of 1300° C. or less, preferably 1150 to 1300° C., more preferably 1250 to 1300° C., to obtain said dielectric ceramic composition.

When firing temperature is too high, rapid grain growth may occur, heterogeneous phase (a Ti-rich phase) is likely to deposit, semiconductorize and reliability is liable to decline.

Preferably, said source material, after fired in reduced atmosphere, is anneal treated (re-oxidizing treatment). With this annealing treatment, insulation resistance improves. Further, reduced atmosphere on firing has oxygen pressure of preferably $10^{-9}$ to $10^{-13}$ MPa ($10^{-8}$ to $10^{-12}$ atm). Annealing temperature is preferably 1150° C. or less and oxygen pressure in the atmosphere is preferably $10^{-6}$ to $10^{-9}$ MPa ($10^{-5}$ to $10^{-8}$ atm).

Electronic device according to the present invention comprises dielectric layer wherein said dielectric layer is composed of abovementioned dielectric ceramic composition.

The electronic device of the present invention is preferably an electronic device such as multilayer ceramic capacitor which inner electrode and dielectric layer are stacked alternately.

Present invention is effective when internal electrode at least include base metal such as nickel.

Manufacturing process of electronic device according to the present invention is characterized in cofiring said internal electrode and dielectric layer under the temperature of 1300° C. or less.

BRIEF DESCRIPTION OF THE DRAWINGS

Below are descriptions of the present invention based on preferred embodiments given with reference to the drawings which

DETAILED DESCRIPTION OF THE INVENTION

Multilayer Ceramic Capacitor

Figure 1:
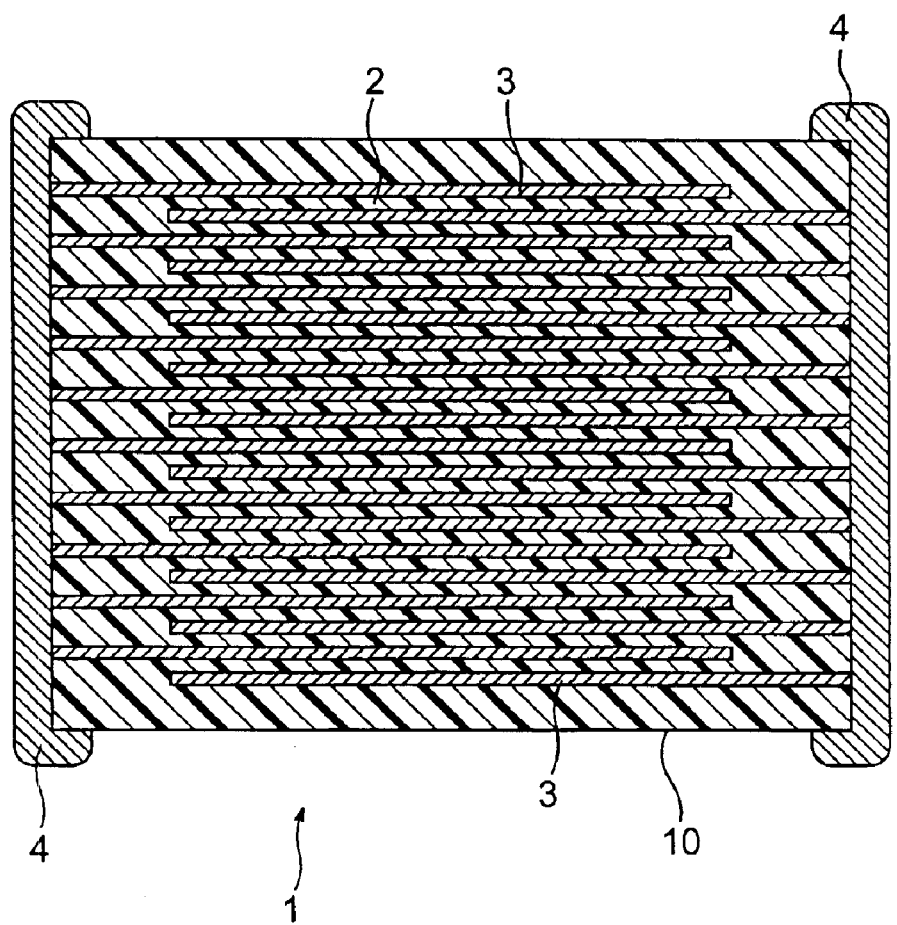
FIG. 1 is a cross-sectional view of multilayer ceramic capacitor according to an embodiment of the present invention.

As shown in FIG. 1, a multilayer ceramic capacitor 1 as electronic device according to an embodiment of the present invention comprises a capacitor element body 10 having the configuration wherein dielectric layers 2 and internal electrode layers 3 are alternately stacked. At both ends of the capacitor element body 10 are formed a pair of external electrode 4 respectively connected to the internal electrode layers 3 alternately arranged inside the element body 10. A shape of the capacitor element body 10 is not particularly limited, but is normally made in parallelpiped shape. Further, the capacitor dimensions are not limited and may be made with suitable dimensions for the use. Usually, however, the dimensions are (0.4 to 5.6 mm)×(0.4 to 5.0 mm)×(0.2 to 1.9 mm) or so.

The internal electrode layers 3 are stacked so that the end faces thereof alternately protrude out to the surfaces of the two opposing ends of the capacitor element body 10. The pair of external electrodes 4 are formed at the two ends of the capacitor element body 10 and are connected to the exposed end faces of the alternately arranged internal electrode layers 3 so as to compose the capacitor circuit.

Dielectric Layers 2

The dielectric layers 2 include a dielectric ceramic composition of the present invention.

Dielectric ceramic composition according to the present invention comprises a main component including 53.00 to 80.00 mol %, preferably 60.00 to 70.00 mol %, magnesium oxide converted to MgO, 19.60 to 47.00 mol %, preferably 29.60 to 39.90 mol %, titanium oxide converted to $TiO_2$ and 0.05 to 0.85 mol %, preferably 0.20 to 0.60 mol %, manganese oxide converted to MnO.

When a content of magnesium oxide is too small, on firing in reduced atmosphere, dielectric ceramic composition is liable to be reduced and semiconductorized, and when too large, it is liable to lower relative dielectric constant.

When a content of titanium oxide is too small, dielectric ceramic composition is liable to lower the relative dielectric constant and when too large, it is liable to be reduced and semiconductorized.

When a content of manganese oxide is too small, dielectric ceramic composition is liable to be reduced and semiconductorized, and when too large, segregation (segregation such as Mn—Ni—O) with internal electrode material including base metal such as nickel is likely to occur, contact may be defective and reliability is liable to decline.

Dielectric ceramic composition of the present invention, preferably, as subcomponent, comprises, with respect to entire dielectric ceramic composition, 0.00 to 0.20 mol %, preferably 0.00 to 0.05 mol % of at least any one of vanadium oxide, yttrium oxide, ytterbium oxide or holmium oxide converted to $V_2O_5$, $Y_2O_3$, $Yb_2O_3$ and $Ho_2O_3$ respectively.

These subcomponents, the same as manganese oxide, are materials providing reducing resisting property. When additive amount of these subcomponents are too large, segregation is likely to occur, contact may be defective and reliability is liable to decline.

Note that various conditions such as a number of layers or thickness of the dielectric layers 2 as shown in FIG. 1 may be suitably determined with its use and object. Moreover, dielectric layers 2 are composed of crystal grain and particle phase wherein the average particle size of the crystal grain for dielectric layers 2 is preferably 3.0 μm or less. This particle phase normally comprises oxide materials composing dielectric material or internal electrode material, oxide materials separately added or oxide materials mixed as impurity during manufacturing process and are normally composed of glass or holohyaline.

Internal Electrode Layer 3

A conductive material included in the internal electrode layers 3 is not particularly limited however, for components of the dielectric layers 2 have reducing resisting property, base metals can be used. As the base metal to be used as a conductive material, Ni or Ni alloys are preferable. As the Ni alloys, an alloy of Ni and at least one kind of elements selected from Mn, Cr, Co and Al is preferable and a content of Ni in the alloys are preferably 95 wt % or more. Note that more than 0.1 wt % or so of P, Fe, Mg and other various trace constituents may be included in the Ni or Ni alloys.

A thickness of the internal electrode layers may be suitably determined in accordance with use, etc. but is normally 0.5 to 5 μm, particularly 1 to 2.5 μm or so is preferable.

External Electrode 4

A conductive material included in the external electrode 4 is not particularly limited, but normally Cu, Ni or alloys of these are used. Further, such as Ag or Ag—Pd alloys can be used as a matter of course. Moreover, according to the preferred embodiments of the invention, inexpensive Ni, Cu or alloys of these are used. A thickness of the external electrode may be suitably determined in accordance with use, etc. but normally 10 to 50 μm or so is preferable.

Manufacturing Process of Multilayer Ceramic Capacitor

A multilayer ceramic capacitor using dielectric ceramic composition of the present invention, in the same way as manufacturing conventional multilayer ceramic capacitor, is manufactured by preparing a green chip by a normal printing method or a sheet method using a paste, firing the same, printing or transferring an external electrode. Following is the manufacturing process concretely described.

First, dielectric layer paste, internal electrode paste and external electrode paste are respectively manufactured.

Dielectric Layer Paste

The dielectric layer paste may be an organic-based paint comprising a mixture of a dielectric source material and an organic vehicle and may also be water-based paint.

As dielectric source material, according to the composition for said dielectric ceramic composition of the present invention, a source material composing main component and subcomponent is used. Further, source material configuration is not particularly limited and oxides compose main component and subcomponent and/or compounds becoming oxides by firing are used. Those source materials may also be powdered obtained by such as liquid-phase synthesis or solid-phase method.

Further, as compounds becoming oxides by firing, carbonates, nitrates, oxalates and organic metal compounds are exemplified. The oxides and the compounds becoming oxides by firing can both be used of course. The content of each compound in the dielectric source material may be suitably determined so as to give the above composition of the dielectric ceramic composition after firing. These source material powder, according to the preferred embodiment of the invention, having average particle size of 0.0005 to 2.0 μm or so is used.

The organic vehicle comprises a binder dissolved in an organic solvent. The binder used for the organic vehicle is not particularly limited, but may be suitably selected from ethyl cellulose, polyvinyl butyral, and other ordinary types of binders. Further, the organic solvent used is also not particularly limited and may be suitably selected from terpineol, butyl carbitol, acetone, toluene, and other organic solvents, etc. in accordance with the printing method, sheet method, or other method of use.

Further, a water-based paint comprises a water-based binder, dispersant, etc. dissolved in water. The water-based binder is not particularly limited, but may be suitably selected from polyvinyl alcohol, cellulose, water-based acrylic resin, emultion, etc.

According to the preferred embodiment of the invention, after weighing the abovementioned dielectric source material powder, pouring water as medium, mixing for 10 to 40 hours or so, drying the mixture and calcinating the mixture preferably at 1100 to 1300° C. for 2 to 4 hours. Afterwards, the calcinated material is subjected to wet grinding by using a ball mill and mixing with abovementioned vehicle to balance paste to be dielectric paste.

Internal Electrode Paste, External Electrode Paste

The internal electrode paste is prepared by kneading the electroconductive material comprising the above various types of electroconductive metals and alloys or various types of oxides becoming the above electroconductive materials after firing, an organic metal compound, resinate, etc. together with the above organic vehicle.

The external electrode paste is prepared in the same way as in the above internal electrode paste.

The content of the organic vehicle in the above each paste is not particularly limited and may fall within the usual amount, for example, the binder may be contained in the amount of 1 to 5 wt % or so and solvent 10 to 50 wt % or so. Further, the each paste may include, in accordance with need, various types of additives selected from dispersants, plasticizers, dielectrics, insulators, etc.

When using a printing method, the dielectric paste and the internal electrode paste are successively printed on the polyethylene terephthalate or other substrate, then cut into a predetermined shape, after which the pastes are peeled off from the substrate to form a green chip. To the contrary, when using a sheet method, a dielectric paste is used to form a green sheet, the internal electrode paste is printed on upper surface of this, after which these are stacked to form a green chip.

Next, this green chip is processed to remove the binder and to fire.

Removing Binder Treatment

The removing binder treatment can be performed under general condition, but particularly when using Ni or Ni alloys or other base metals as the electroconductive material for internal electrode layers, it is determined that in air atmosphere, temperature raising rate is 5 to 300° C./hour, in particular 10 to 100° C./hour, a holding temperature is 180 to 400° C., in particular 200 to 300° C., and a temperature holding time is 5 to 24 hours, in particular 5 to 20 hours.

Firing (Sintering)

Firing atmosphere for the green chip may be suitably determined in accordance with the type of electrocondictive material in the internal electrode layer paste, but when using Ni or Ni alloys or other base metal as the electroconductive material, it is preferable to reduce atmosphere and oxygen partial pressure in the firing atmosphere is preferably $10^{-9}$ to $10^{-16}$ MPa ($10^{-8}$ to $10^{-15}$ atm), more preferably, $10^{-9}$ to $10^{-13}$ MPa ($10^{-8}$ to $10^{-12}$ atm). When oxygen partial pressure at firing is too low, the electroconductive material of this internal electrode tend to become abnormally sintered and broken in the middle. While when oxygen partial pressure at the firing is too high, the internal electrode tend to become oxidized.

The holding temperature at firing is 1300° C. or less, preferably 1000 to 1300° C., more preferably 1200 to 1300°

C. When the holding temperature is too low, the densification tend to become insufficient, while when the holding temperature is too high, there is a tendency toward breaking of the electrodes due to abnormal sintering in the internal electrode, or deterioration of the temperature dependence of capacitance due to dispersion of the internal electrode material.

The firing conditions other than the above conditions are that preferably, the temperature raising rate is 50 to 500° C./hour, more preferably, 200 to 300° C./hour, a temperature holding time is 0.5 to 8 hours, more preferably, 1 to 3 hours, and the cooling rate is 50 to 500° C./hour, more preferably, 200 to 300° C./hour. The firing atmosphere is desirable to be reducing atmosphere and as the atmosphere gas, it is preferable to use, for instance, a wet mixed gas of nitrogen gas and hydrogen gas.

After firing in the reducing atmosphere, the fired body of capacitor tip is preferably anneal treated(heat treatment).

Annealing (Heat Treatment)

The annealing is a treatment that re-oxidizes dielectric layer and this, enables the insulation resistance to increase. In annealing atmosphere, the oxygen partial pressure is preferably $10^{-10}$ MPa ($10^{-9}$ atm) or more, more preferably, $10^{-6}$ to $10^{-9}$ MPa ($10^{-5}$ to $10^{-8}$ atm). When oxygen partial pressure is too low, re-oxidation of the dielectric layers 2 is difficult, while when oxygen partial pressure is too high, the internal electrode layers 3 tend to become oxidized.

The holding temperature at the time of annealing is 1150° C. or less, more preferably 500 to 1100° C. When the holding temperature is too low, re-oxidation of the dielectric layers become insufficient so the insulation resistance tends to deteriorate and its accelerating lifetime short. On the other hand, when the holding temperature is too high, not only do the internal electrode oxidize and the capacitance fall, but also end up reacting with the dielectric component resulting in a tendency toward deterioration of the temperature dependence of capacitance, the insulation resistance and its accelerating lifetime. Note that the annealing may be composed of only a temperature raising process and a temperature reducing process. In this case, the temperature holding time is zero and the holding temperature is synonymous with the maximum temperature.

The conditions other than the above conditions in annealing are that the temperature holding time is 0 to 20 hours, more preferably, 6 to 10 hours, the cooling rate is 50 to 500° C./hour, more preferably, 100 to 300° C./hour. Note that for annealing atmospheric gas, preferably a wet nitrogen gas is used Further, in the same way as abovementioned firing, during the process for said removing binder teratment and annealing process, to wet nitrogen gas or mixed gas, a wetter, etc. may be used. In this case, the temperature of the water is preferably 5 to 75° C.

Moreover, the removing binder treatment, firing, and annealing may be performed consecutively or independently. When these processes are performed consecutively, it is preferable to proceed with following order. Treating to remove binder, changing the atmosphere without cooling, followed by raising the temperature to holding temperature of firing, cooling to the holding temperature of annealing, and anneal treating by changing atmosphere. To the contrary, when these processes are performed independently, for firing, after raising the temperature to holding temperature of removing binder treatment in the atmosphere of nitrogen gas or wet nitrogen gas, further raising of the temperature in the changed atmosphere is preferable. And after cooling to the holding temperature of annealing, changing the atmosphere again to the nitrogen gas or wet nitrogen gas, continued cooling is preferable. Also, considering the annealing, after raising the temperature of holding temperature in nitrogen gas atmosphere, the atmosphere can be changed or whole annealing process can be proceeded in wet nitrogen gas atmosphere.

The thus obtained capacitor fired body is, for instance, end polished using barrel polishing or sandblasting etc., then printed or transferred with an external electrode paste and fired to form the external electrodes 4. The firing conditions of the external electrode paste are, for instance, preferably 600 to 800° C. for 10 minutes to 1 hour or so in a wet mixed gas of nitrogen or hydrogen. Further, in accordance with need, the surfaces of the external electrodes 4 may be formed with a covering layer(pad layer) using plating techniques, etc.

The thus produced ceramic capacitor 1 of the preferred embodiment of the invention is mounted onto a printed substrate by soldering, etc. for use in various types electronic equipment.

Note that present invention is not limited to the abovementioned embodiments and may be modified in various ways within the scope of the invention.

For instance, in the abovementioned embodiments, illustration was made of a multilayer ceramic capacitor as the electronic device according to the present invention, but the electronic device according to the present invention is not limited to a multilayer ceramic capacitor and may be any device having dielectric layer composed of a dielectric ceramic composition of the above composition.

EXAMPLE

Below are concrete examples for the preferred embodiment of the present invention describing the invention further in detail. However, the present invention is not limited by the examples.

Example 1

First, as starting source material of manufacturing dielectric material, a main component materials ($MgO$, $TiO_2$, $MnCO_3$), and subcomponent materials ($V_2O_5$, $Y_2O_3$, $Yb_2O_3$, $Ho_2O_3$) respectively having an average particle size of 0.1 to 1.0 $\mu$m were prepared.

After these source materials were weighed in order that the compositions after firing become as shown in below mentioned table 1, to these source materials, water as medium was poured and mixed for 16 hours by ball mill. Then, the mixture was dried and the dried material was calcinated at 1200° C. for 2 hours. Afterwards, the obtained calcinated material was subjected to wet grinding by ball mill and was dried.

100 parts by weight of thus obtained dried dielectric source material, 5.4 parts by weight of acrylic resin, 16 parts by weight of MEK(Methyl Ether Ketone), 45 parts by weight of acetone, 6 parts by weight of mineral spirits and 4 parts by weight of toluene were mixed by ball mill to make a paste and dielectric paste was obtained.

Then, 100 parts by weight having Ni particles of an average particle size of 0.8 μm, 35 parts by weight of organic vehicle (8 parts by weight of an ethyl cellulose dissolved in 92 parts by weight of butyl carbitol) and 7 parts by weight of butyl carbnitol were kneaded to make a paste and internal electrode layer paste was obtained.

Then, 100 parts by weight of Cu particles of an average particle size of 0.5 μm, 35 parts by weight of organic vehicle, (8 parts by weight of an ethyl cellulose dissolved in 92 parts by weight of butyl carbitol) and 7 parts by weight of butyl carbnitol were kneaded by a triple-roll to make pastes and external electrode pastes were obtained.

First, the abovementioned dielectric layer paste was used to form green sheet having 25 μm thickness on a PET film. The internal electrode layer paste was printed on this, then the sheet was peeled off from the PET film. Second, the thus obtained green sheets and protection green sheet (on which the internal electrode layer paste is not printed) were layered, adhered by means of pressure to prepare a green chip. The number of layered sheets comprising the internal electrode was 4.

Then the green chip was cut to a predetermined size and was processed to remove the binder, fire and anneal(heat treatment) and obtained a multilayer ceramic fired body. The removing binder treatment was performed under conditions of a temperature raising rate of 15° C./hour, a holding temperature of 280° C., a temperature holding time is 8 hours, and in the air atmosphere. And firing conditions were a temperature raising rate of 200° C./hour, a holding temperature of 1300° C., a temperature holding time of 2 hours, a cooling rate of 300° C./hour and in an atmosphere of a wet mixed gas of $N_2+H_2$ (oxygen partial pressure was $10^{-9}$ to $10^{-13}$ MPa ($10^{-8}$ to $10^{-12}$ atm). The annealing conditions were a holding temperature of 1100° C., a temperature holding time of 3 hours, a cooling rate of 300° C./hour, and in an atmosphere of a wet $N_2$ gas (oxygen partial pressure was $10^{-6}$ MPa ($10^{-5}$ atm). Note that at the time of firing and annealing, for wetting the atmosphere gasses, a wetter having a water temperature of 35° C. was used.

Then after the end faces of the multilayer ceramic fired body were polished by sandblasting, external electrode paste was transferred to the end faces and in an atmosphere of wet gasses of $N_2+H_2$, fired at 800° C. for 10 minutes to form external electrode so as to obtain samples of a multilayer ceramic capacitor as composition shown in FIG. 1.

The size of the thus obtained capacitor samples was 3.2 mm×1.6 mm×0.6 mm, the number of dielectric layers sandwiched by the internal electrode layers was 4 and their thickness was 15 μm, and the thickness of the internal electrode layers was 2 μm. The characteristics below of the respective samples were evaluated.

Relative Electric Constant(ε r). Dielectric Loss Tangent(tan δ), Insulation Resistance(IR)

The capacitance of the sample capacitors were measured at standard temperature of 25° C. by a digital LCR meter (4274A, YHP made) under conditions of a frequency 1 kHz, and an input signal level(a measurement voltage) of 1Vrms. Then, by thus obtained capacitance and electrode dimension and intereletrode distance for the sample capacitors, relative dielectric constant(no unit) were calculated.

Further, the dielectric loss tangent(unit in %) of the capacitor sample were measured by the LCR meter used when calculating the relative dielectric constant, under conditions of 25° C. and 1 kHz.

Insulation resistance(unit in Ω) was measured by the insulation tasting set(R8340A, Advantest made), under conditions of 25° C. and DC50V. The result is shown in Table 1.

TABLE 1

| | Compositions [mol %] | | | Additives [mol %] | | | | Electro-Characteristics | | |
|---|---|---|---|---|---|---|---|---|---|---|
| | MgO | TiO2 | MnO | V2O5 | Y2O3 | Yb2O3 | Ho2O3 | ε s | tan δ [%] | IR[Ω] |
| ✕1 | 49.79 | 49.79 | 0.42 | 0.00 | 0.00 | 0.00 | 0.00 | 27 | 3.51 | incapable |
| ✕2 | 50.00 | 50.00 | 0.00 | 0.00 | 0.00 | 0.00 | 0.00 | 32 | 6.04 | incapable |
| ✕3 | 66.67 | 33.33 | 0.00 | 0.00 | 0.00 | 0.00 | 0.00 | 21 | 0.10 | incapable |
| 4 | 66.62 | 33.31 | 0.08 | 0.00 | 0.00 | 0.00 | 0.00 | 17 | 0.08 | $5*10^{10}$ |
| 5 | 66.52 | 33.26 | 0.23 | 0.00 | 0.00 | 0.00 | 0.00 | 17 | 0.07 | $6*10^{10}$ |
| 6 | 66.42 | 33.21 | 0.38 | 0.00 | 0.00 | 0.00 | 0.00 | 19 | 0.05 | $3*10^{10}$ |
| 7 | 66.27 | 33.13 | 0.60 | 0.00 | 0.00 | 0.00 | 0.00 | 19 | 0.05 | $7*10^{10}$ |
| 8 | 66.17 | 33.08 | 0.75 | 0.00 | 0.00 | 0.00 | 0.00 | 20 | 0.05 | $8*10^{10}$ |
| 9 | 66.13 | 33.06 | 0.81 | 0.00 | 0.00 | 0.00 | 0.00 | 19 | 0.05 | $8*10^{10}$ |
| ✕10 | 66.09 | 33.05 | 0.86 | 0.00 | 0.00 | 0.00 | 0.00 | 6 | 1.50 | $3*10^{13}$ |
| ✕11 | 52.16 | 47.42 | 0.42 | 0.00 | 0.00 | 0.00 | 0.00 | 26 | 3.08 | $3*10^{7}$ |
| 12 | 54.32 | 45.27 | 0.41 | 0.00 | 0.00 | 0.00 | 0.00 | 20 | 0.09 | $5*10^{10}$ |
| 13 | 79.73 | 19.93 | 0.34 | 0.00 | 0.00 | 0.00 | 0.00 | 14 | 0.04 | $7*10^{10}$ |
| ✕14 | 80.12 | 19.54 | 0.34 | 0.00 | 0.00 | 0.00 | 0.00 | 8 | 0.05 | $9*10^{10}$ |
| 15 | 66.42 | 33.21 | 0.28 | 0.10 | 0.00 | 0.00 | 0.00 | 19 | 0.05 | $3*10^{10}$ |
| 16 | 66.42 | 33.21 | 0.18 | 0.20 | 0.00 | 0.00 | 0.00 | 18 | 0.05 | $1*10^{10}$ |
| ✕17 | 66.42 | 33.21 | 0.13 | 0.25 | 0.00 | 0.00 | 0.00 | 16 | 0.09 | $1*10^{10}$ |
| 18 | 66.42 | 33.21 | 0.28 | 0.00 | 0.10 | 0.00 | 0.00 | 19 | 0.05 | $1*10^{10}$ |
| 19 | 66.42 | 33.21 | 0.28 | 0.00 | 0.00 | 0.10 | 0.00 | 19 | 0.05 | $5*10^{10}$ |
| 20 | 66.42 | 33.21 | 0.28 | 0.05 | 0.05 | 0.00 | 0.00 | 19 | 0.05 | $2*10^{10}$ |
| 21 | 66.42 | 33.21 | 0.28 | 0.00 | 0.05 | 0.05 | 0.00 | 19 | 0.05 | $2*10^{10}$ |
| 22 | 66.42 | 33.21 | 0.28 | 0.03 | 0.03 | 0.03 | 0.00 | 19 | 0.05 | $2*10^{10}$ |
| 23 | 66.42 | 33.21 | 0.18 | 0.20 | 0.00 | 0.00 | 0.10 | 19 | 0.05 | $4*10^{10}$ |
| 24 | 66.42 | 33.21 | 0.28 | 0.03 | 0.00 | 0.00 | 0.00 | 20 | 0.04 | $3*10^{11}$ |
| 25 | 66.42 | 33.21 | 0.28 | 0.00 | 0.03 | 0.00 | 0.00 | 20 | 0.04 | $3*10^{11}$ |

TABLE 1-continued

| | Compositions [mol %] | | | Additives [mol %] | | | Electro-Characteristics | | |
|---|---|---|---|---|---|---|---|---|---|---|
| | MgO | TiO2 | MnO | V2O5 | Y2O3 | Yb2O3 | Ho2O3 | ε s | tan δ [%] | IR[Ω] |
| 26 | 66.42 | 33.21 | 0.28 | 0.00 | 0.00 | 0.03 | 0.00 | 20 | 0.04 | 3*10$^{11}$ |
| 27 | 66.42 | 33.21 | 0.28 | 0.00 | 0.00 | 0.00 | 0.03 | 20 | 0.04 | 3*10$^{11}$ |

※Compositions out of the range

Further, according to table 1, figures with the symbol "*" of the sample numbers are the sample numbers having composition out of preferable composition range for the present invention. It is the same with the other tables.

Evaluation 1

As shown in table 1, by comparing the sample numbers 1 to 14, dielectric ceramic composition comprising 53.00 to 80.00 mol %, preferably 60.00 to 70.00 mol %, magnesium oxide converted to MgO, 19.60 to 47.00 mol %, preferably 29.60 to 39.90 mol %, titanium oxide converted to $TiO_2$ and 0.05 to 0.85 mol %, preferably 0.20 to 0.60 mol %, manganese oxide converted to MnO was preferable. That is, when these compositions were used, even when fired in reduced atmosphere, it was difficult to lower the resistance and relative dielectric constant were high, further, dielectric loss tangent were less.

Further, by comparing the sample numbers 15 to 23, dielectric ceramic composition according to the present invention, preferably, as subcomponent, with respect to entire dielectric ceramic composition, comprises 0.00 to 0.20 mol % of at least any one of vanadium oxide, yttrium oxide, ytterbium oxide or holmium oxide converted to $V_2O_5$, $Y_2O_3$, $Yb_2O_3$ and $Ho_2O_3$ respectively. That is, when these subcomponents were comprised at a determined mol %, even when fired in reduced atmosphere, it was difficult to lower the resistance and relative dielectric constant were high, further, dielectric loss tangent were less.

Furthermore, by comparing the sample numbers 24 to 27 and sample number 15, the abovementioned 0.00 to 0.20 mol % was more preferable in 0.00 to 0.05 mol %.

Example 2

Capacitor samples were prepared in the same way as the sample number 6 in example 1 except firing was proceeded at 1250° C. or 1350° C. And in the same way as example 1, insulation resistance was tested. Further, in example 2, high temperature loading test was performed and the fraction defective was measured. Also, SEM picture for cross-sectional view of dielectric layer in capacitor samples was observed to see if the heterogeneous phase (a Ti-rich phase) exists. The result is shown in Table 2.

TABLE 2

| | Firing Temperature (° C.) | Heterogeneous Phase (Ti-rich phase) | Electro-Characteristic IR[Ω] | High Temperature Loading Test Fraction Defective[%] |
|---|---|---|---|---|
| 24 | 1250 | not existed | 2*10$^{10}$ | 0.0 |
| 6 | 1300 | not existed | 3*10$^{10}$ | 0.0 |
| ※25 | 1350 | existed | incapable | 100.0 |

At high temperature loading test, 20 capacitor samples prepared under the same condition were impressed with DC 100V at 150° C. and after left for 1000 hours, insulation resistances(IR) were measured. For each 20 capacitor samples, insulation resistances(IR) under 1×10$^8$ Ω were considered as defective goods and the defective ratios for those were calculated.

Figure 2A:
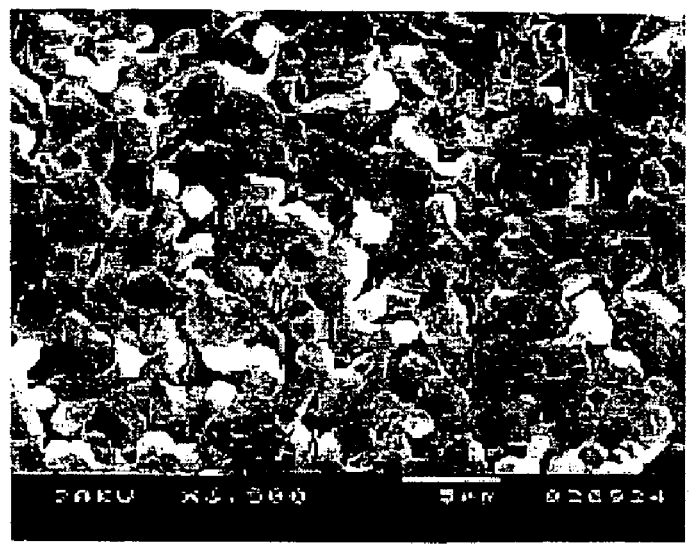
FIG. 2A is a SEM picture of dielectric ceramic composition according to an example of the present invention.
Figure 2B:
FIG. 2B is a SEM picture of dielectric ceramic composition according to an comparative example of the present invention.

Further, SEM picture for cross-sectional view of dielectric layer in sample number 6 is shown in FIG. 2A and SEM picture for cross-sectional view of dielectric layer in sample number 26 is shown in FIG. 2A. The existence of the heterogeneous phase is considered by the existence of the heterogeneous phase in FIG. 2B.

Evaluation 2

As shown in table 2, by comparing sample numbers 6, 24, and 25, firing temperature was preferable at 1300° C. or less and 1250° C. was also possible to be sintered. Also, as the result shown in table 2, when heterogeneous phase existed, dielectric layer semiconductorized and the reliability declined.

Example 3

Capacitor samples were prepared in the same way as the sample number 6 in example 1 except annealing treatment was not proceeded. And in the same way as example 1, insulation resistance was tested. The result is shown in Table 3.

TABLE 3

| | Annealing (N2 only) | Electro-Characteristic IR[Ω] |
|---|---|---|
| 26 | not treated | 4*10$^9$ |
| 6 | treated | 3*10$^{10}$ |

Evaluation 3

As shown in table 3, by comparing sample number 26 and sample number 6, with this annealing treatment, insulation resistance improved.

According to the description above, the present invention is able to provide dielectric ceramic composition of non-reducing property preferably used for multilayer ceramic capacitor having base metal, such as Ni, as internal electrode which is hard to reduce resistance even firing in reduced atmosphere, and has high relative dielectric constant and small amount of dielectric loss.

What is claimed is:

1. A dielectric ceramic composition comprising a main component including 53.00 to 80.00 mol % magnesium oxide converted to MgO, 19.60 to 47.00 mol % titanium oxide converted to $TiO_2$ and 0.05 to 0.85 mol % manganese oxide converted to MnO.

2. The dielectric ceramic composition as in claim 1 comprising a main component including 60.00 to 70.00 mol % said magnesium oxide converted to MgO, 29.60 to 39.90 mol % said titanium oxide converted to $TiO_2$ and 0.20 to 0.60 mol % said manganese oxide converted to MnO.

3. The dielectric ceramic composition as in claim 1, as subcomponent, further comprising, with respect to entire dielectric ceramic composition, 0.00 to 0.20 mol % of at least any one of vanadium oxide, yttrium oxide, ytterbium oxide or holmium oxide converted to $V_2O_5$, $Y_2O_3$, $Yb_2O_3$ and $Ho_2O_3$ respectively.

4. The dielectric ceramic composition as in claim 3 comprising, with respect to entire dielectric ceramic composition, 0.00 to 0.05 mol % of at least any one of said vanadium oxide, yttrium oxide, ytterbium oxide or holmium oxide converted to $V_2O_5$, $Y_2O_3$, $Yb_2O3$ and $Ho_2O_3$ respectively.

5. A process of manufacturing dielectric ceramic composition as in claim 1, comprising the steps of preparing source material for said dielectric ceramic composition and firing said source material under the temperature of 1300° C. or less to obtain said dielectric ceramic composition.

6. The process of manufacturing dielectric ceramic composition as in claim 5 characterized in that said source material is anneal treated after being fired in reducing atmosphere.

7. An electronic device comprising dielectric layers, characterized in that said dielectric layers are composed of the dielectric ceramic composition as in claim 1.

8. An electronic device wherein inner electrodes and dielectric layers stacked alternately, characterized in that said dielectric layers are composed of the dielectric ceramic composition as in claim 1.

9. The electronic device as in claim 8, wherein said internal electrode at least includes nickel.

10. A process of manufacturing electronic device as in claim 8, characterized in cofiring internal electrode and dielectric layers under the temperature of 1300° C. or less.

11. The process of manufacturing the electronic device as in claim 8 characterized in that said dielectric ceramic composition is anneal treated after being fired in reducing atmosphere.

12. A process of manufacturing dielectric ceramic composition as in claim 2, comprising the steps of preparing source material for said dielectric ceramic composition and firing said source material under the temperature of 1300° C. or less to obtain said dielectric ceramic composition.

13. A process of manufacturing dielectric ceramic composition as in claim 3, comprising the steps of preparing source material for said dielectric ceramic composition and firing said source material under the temperature of 1300° C. or less to obtain said dielectric ceramic composition.

14. An electronic device comprising dielectric layers, characterized in that said dielectric layers are composed of the dielectric ceramic composition as in claim 2.

15. An electronic device comprising dielectric layers, characterized in that said dielectric layers are composed of the dielectric ceramic composition as in claim 3.

16. An electronic device wherein inner electrodes and dielectric layers stacked alternately, characterized in that said dielectric layers are composed of the dielectric ceramic composition as in claim 2.

17. An electronic device wherein inner electrodes and dielectric layers stacked alternately, characterized in that said dielectric layers are composed of the dielectric ceramic composition as in claim 3.

18. A process of manufacturing electronic device as in claim 9, characterized in cofiring internal electrode and dielectric layers under the temperature of 1300° C. or less.

* * * * *